United States Patent
Xu et al.

(10) Patent No.: US 8,632,849 B2
(45) Date of Patent: Jan. 21, 2014

(54) ANTI-COUNTERFEIT FILM WITH AN AMPHICHROIC PATTERN AND A PREPARATION METHOD THEREOF

(75) Inventors: Liangheng Xu, Shanghai (CN); Lanxin Dong, Shanghai (CN); Yun Gao, Shanghai (CN); Zhixi Zhang, Shanghai (CN)

(73) Assignee: Shanghai Techsun Anti-Counterfeiting Technology Holding Co., Ltd., Shanghai (CN)

( * ) Notice: Subject to any disclaimer, the term of this patent is extended or adjusted under 35 U.S.C. 154(b) by 157 days.

(21) Appl. No.: 13/125,749

(22) PCT Filed: Jun. 9, 2009

(86) PCT No.: PCT/CN2009/072189
§ 371 (c)(1),
(2), (4) Date: Jun. 22, 2011

(87) PCT Pub. No.: WO2010/045797
PCT Pub. Date: Apr. 29, 2010

(65) Prior Publication Data
US 2011/0256351 A1    Oct. 20, 2011

(30) Foreign Application Priority Data
Oct. 23, 2008    (CN) .......................... 2008 1 0201663

(51) Int. Cl.
*B41M 3/14* (2006.01)
*B44F 1/12* (2006.01)

(52) U.S. Cl.
USPC .......................................................... 427/7

(58) Field of Classification Search
USPC .......................................................... 427/7
See application file for complete search history.

(56) References Cited

U.S. PATENT DOCUMENTS 6,410,130 B1 * 6/2002 Schuhmacher et al. ...... 428/327
6,690,439 B2 * 2/2004 Ahn et al. ...................... 349/115

FOREIGN PATENT DOCUMENTS

| CN | 1166748 A | 9/2004 |
| CN | 1637117 A | 7/2005 |
| CN | 1693388 A | 11/2005 |
| CN | 101033302 A | 9/2007 |

* cited by examiner

Primary Examiner — Kelly M Gambetta
(74) Attorney, Agent, or Firm — Dickstein Shapiro LLP

(57) ABSTRACT

An anti-counterfeit film comprising an amphichroic pattern is prepared by (1) mixing a polymerizable liquid crystal material of chiral structure and a photoinitiator, blade-coating the mixture on a base film and then drying; (2) partially exposing the resulting material produced in step (1) using a positioned UV lamp, then drying and exposing in an UV radiation to obtain a desired film. The film prepared by the method has an amphichroic pattern which typically presents a red and green picture when being vertically observed, the original red and green respectively changes into green and blue when being observed at a certain incline angel. The anti-counterfeit film is characterized by obvious color change, easy identification, practicability and convenience, thus facilitating promotion and application.

9 Claims, 1 Drawing Sheet

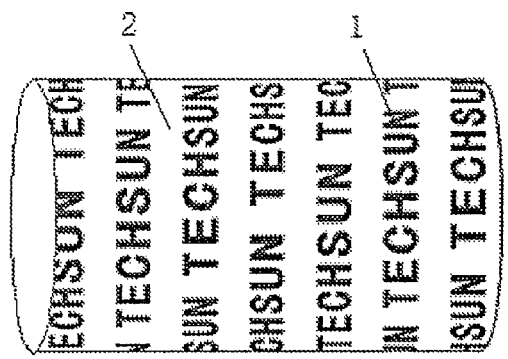

ANTI-COUNTERFEIT FILM WITH AN AMPHICHROIC PATTERN AND A PREPARATION METHOD THEREOF

TECHNICAL FIELD

The present invention relates to an anti-counterfeit film and a preparation method thereof, particularly an anti-counterfeit film having an amphichroic pattern and a preparation method thereof.

BACKGROUND OF ART

The development of commercial economy brings generation of tremendous counterfeit and imitation of products of well-known brands in various fields, which causes severe economic losses and social problems and brings anti-counterfeit technology into wide demanding. The development of materials having optical-angle discoloration effect becomes rapid due to the advantageous of being recognized readily by publics, and the materials are widely used in the fields of anti-counterfeit and decorating materials.

The optical-angle discoloration effect of a material can be obtained through formation of an intermittent layered structure of the material. The effect can be seen from a thin film obtained by co-extrusion of a metal and ceramic sheet in alternative (Dobrowolski, J. A.; Ho, F. C. and Waldorf. A., Applied Optics, 1989, 28, p 14). However, the material has a high cost and cannot be used conveniently.

In addition, a cholesteric liquid crystal having selective reflection of light was used as optical security device previously, such as the technology disclosed in GB 1387398. However, the application of a small-molecular cholesteric liquid crystal is limited. Since the small-molecular cholesteric liquid crystal flows easily, they should be encapsulated, such as, sandwiched in a glass tank or formulated to microcapsules or other structures for application. U.S. Pat. No. 6,410,130 discloses coating a solution of a polymerizable cholesteric liquid crystal on a base film through a transfer roller, removing solvent through an oven tunnel, then UV curing the resultant to form a film having optical-angle discoloration, or grinding the resultant to produce pigment. However, one defect of the technology is that a pattern of optical-angle discoloration is obtained by printing with an oil ink made by adding the discoloration pigment obtained from the patent to a vehicle (or resin). The presence of the vehicle lowers the concentration of the discoloration pigment, and thus the discoloration effect is not very obvious and the color is not very colorful.

Content of the Invention

An object of the present invention is to provide an anti-counterfeit film having an amphichroic pattern and a preparation method thereof to overcome the above defect of the prior art.

The method of preparing an anti-counterfeit film having an amphichroic pattern of the present invention comprises the following steps:

(1) mixing a polymerizable liquid crystal material of chiral structure and a photoinitiator, heating the mixture to 80~120° C., blade-coating the mixture on a base film to obtain a coating with a controlled thickness of from 2 to 15 µm, then drying; standing at a temperature of from 80 to 120° C. for 0.5 to 2.5 minutes, at this time, a particular color such as red is shown when being observed perpendicularly, and the color changes into green when being observed at a certain tilted angle;

(2) then subjecting the product of step (1) to a local exposure by locating an ultraviolet lamp at an exposure time of 5 to 30 seconds and an exposure energy of from 1.5 to 15 mw/cm² to polymerize the crystal liquid material at the parts of undergoing UV exposure, and fix the structure, then drying; standing at a temperature of from 80 to 120° C. for 0.5 to 2.5 minutes so that the liquid crystal material not undergoing UV exposure shows a color different from the original color, for example, the original green changes into blue if being observed at a certain tilted angle; further subjecting to UV exposure at an exposure time of 5 to 30 seconds and an exposure energy of 1.5 to 15 mw/cm² to fix the color, to obtain the anti-counterfeit film having an amphichroic pattern.

The said polymerizable liquid crystal material of chiral structure is cholesteric siloxane liquid crystal having a chemical formula of $[RY^1_p Y^2_q SiO]_m$;

wherein,

R is $C_1$-$C_{10}$ alkyl;

$Y^1$ is alkyl or alkenyl containing an esogenic unit;

$Y^2$ is an organic group containing at least one polymerizable group and at least one divalent cyclic group;

p and q are positive numbers greater than 0 and smaller than 1, p+q=1; and m is an integer from 3 to 10.

The polymerizable liquid crystal material of chiral structure can be a commercial product such as products of brand CC3767 or CC3939 from Wacker Chemie AG. CC37 67 and CC393 are both cholesteric siloxane liquid crystals, and the difference there-between is that they have different proportions of mesogenic units, i.e., their p vales are different.

The said photoinitiator is one or more members selected from the group consisting of benzophenone, benzoyl peroxide, azobis(isobutyronitrile), 2-hydroxy-methylphenylpropane-1-one, 1-hydroxycyclohexylphenylketone or 2-methyl-1-(4-methylthiophenyl)-2-morpholinyl-1-propanone; and is used in an amount of between 2 and 10% by weight of the polymerizable liquid crystal material of chiral structure.

The said base film is selected from the group consisting of a polycarbonate film, a polyester film or a polypropylene film, preferably a polyester film, or a base film coated with a polyimide-type liquid crystal orientation agent or treated with polyvinyl alcohol.

The ultraviolet light source is preferably a 300 to 2000 W mercury xenon lamp having an intensity of 1.5~15 mw/cm² at 280 nm to 350 nm.

After alignment orientation, the polymerizable liquid crystal material of chiral structure comprises a particular super helical structure, presents selective reflection similar to circular polarization light, can selectively reflect light of a particular wavelength, and has a macro-performance of optical-angle discoloration effect, which means that when an observing angle is changed, one hue will change to another hue.

The film obtained from the method of the present invention has an amphichroic pattern. A typical pattern shows a red-green image when being observed perpendicularly, and the original red and green respectively changes into green and blue when being observed at a certain tilted degree. The discoloration is obvious, can be recognized easily, is convenient for use and can be applied widely.

DESCRIPTION OF FIGURES

FIG. 1 is a structure of a quartz glass shade.

MODE OF CARRYING OUT THE INVENTION

FIG. 1 is a schematic diagram of the structure of the quartz glass shade. The said local exposure by locating an ultraviolet lamp refers to that there is a quartz glass shade outside the ultraviolet lamp, wherein a part of the quartz glass shade is equipped with an aluminum-plated layer and thus is an opaque area 1, and another part of the quartz glass shade is a transparent area 2 that is not plated with aluminum. The transparent area 2 can be designed to a particular pattern. After coated with the polymerizable liquid crystal material, the base film can be subjected to a local exposure by locating the quartz glass shade, as shown in FIG. 1. Alternatively, a composite film printed with a covering layer pattern and a base film coated with the liquid crystal material are combined, UV exposing from one side of the composite film, then the transparent part is cured by UV, while the part having a covering layer pattern is not exposed whereby a locating local exposure is achieved.

Example 1

The polymerizable liquid crystal material of chiral structure is cholesteric siloxane liquid crystal, and CC3939 and CC3767 from Wacker Chemie AG can be used.

7.0 gram of CC3767, 3.0 gram of CC3939 and 0.4 gram of 2-methyl-1-(4-methylthiophenyl)-2-morpholinyl-1-propanone are mixed homogeneously, heated to 85° C. and blade-coated on a PET polyester film to form a coating with a thickness of 5 μm. The coating is passed through an infrared oven tunnel set at a temperature of 85° C. and stays therein for 60 seconds. A 800 W mercury xenon lamp overcoated by the locally transparent quartz glass shade as shown in FIG. 1 with the transparent part having the wording "TECHSUN" is used to achieve a locating local exposure for 10 seconds with an exposure energy of 3 mw/cm$^2$. The coating is transferred into an oven tunnel set at a temperature of 105° C. again and stays therein for 60 seconds, and subjects to an overall exposure with a 800 W mercury xenon lamp for 10 seconds, thereby obtaining a pattern having amphichroic effect (the wording "TECHSUN" is red when being observed perpendicularly and green when being observed at a titled angle of 45°, and the rest part is green when being observed perpendicularly and blue when being observed at a titled angle of 45°).

The result is as below when detecting with transmission spectrum method:

| Optical-angle discoloration effect | optical property, at incident angle of 0° | wording part the rest part | 642 nm 543 nm |
|---|---|---|---|
| | optical property, at incident angle of 45° | wording part the rest part | 520 nm 462 nm |

Example 2

7.0 gram of CC3767, 3.0 gram of CC3939 and 1.0 gram of 2-methyl-1-(4-methylthiophenyl)-2-morpholinyl-1-propanone are mixed homogeneously, heated to 85° C. and blade-coated on PET polyester film to form a coating with a thickness of 12 μm. The coating is passed through an infrared oven tunnel set at a temperature of 85° C., stays therein for 60 seconds and is combined with a PET composite film printed with "TECHSUN" in black. Exposing 10 seconds from one side of the PET composite film with a 800 W mercury xenon lamp at an exposure energy of 3 mw/cm$^2$. After removing the PET composite film, the coating is transferred into the oven tunnel set at a temperature of 105° C. for 60 seconds again and further subjected to an overall exposure with a 800W mercury xenon lamp for 10 seconds, thereby obtaining a pattern having the amphichroic effect (the wording "TECHSUN" is green when being observed perpendicularly and blue when being observed at a tilted angle of 45°, and the rest is red when being observed perpendicularly and green when being observed at a tilted angle of 45°).

| Optical-angle discoloration effect | optical property, at incident angle of 0° | wording part the rest part | 550 nm 635 nm |
|---|---|---|---|
| | optical property, at incident angle of 45° | wording part the rest part | 455 nm 515 nm |

Example 3

10.0 gram of CC3767, 0.2 gram of 2-methyl-1-(4-methylthiophenyl)-2-morpholinyl-1-propanone are mixed homogeneously, heated to 85° C. and blade-coated on a PET polyester film to form a coating with a thickness of 8 μm. The coating is passed through an infrared oven tunnel set at a temperature of 105° C., stays therein for 60 seconds and is combined with a PET composite film printed with "TECHSUN" in black. Exposing for 10 seconds from one side of the PET composite film with a 800 W mercury xenon lamp at an exposure energy of 3 mw/cm$^2$. After removing the PET composite film, the coating is transferred into an oven tunnel set at a temperature of 120° C. for 60 seconds again and further subjected to an overall exposure with a 800 W mercury xenon lamp for 10 seconds, thereby obtaining a pattern having the amphichroic effect (the wording "TECHSUN" is green when being observed perpendicularly and blue when being observed at a tilted angle of 45°, and the rest is red when being observed partperpendicularly and green when being observed at a tilted angle of 45°).

| Optical-angle discoloration effect | optical property, at incident angle of 0° | wording part the rest part | 558 nm 663 nm |
|---|---|---|---|
| | optical property, at incident angle of 45° | wording part the rest part | 463 nm 550 nm |

The invention claimed is:

1. A method for preparing an anti-counterfeit film having an amphichroic pattern, comprising:
   (1) mixing a polymerizable liquid crystal material of chiral structure and a photoinitiator, heating the mixture to a temperature in the range of 80 to 120° C., blade-coating the mixture on a base film, and then drying the coated base film;
   (2) subjecting the dried mixture to a local exposure of an ultraviolet lamp, followed by drying and another exposure to ultraviolet, to obtain an anti-counterfeit film having an amphichroic pattern;
   wherein the said polymerizable liquid crystal material of chiral structure is a cholesteric siloxane liquid crystal.

2. The method according to claim 1, wherein the said photoinitiator is one or more members selected from the group consisting of benzophenone, benzoyl peroxide, azobis(isobutyronitrile), 2-hydroxy-methylphenylpropane-1-one, 1-hydroxycyclohexylphenylketone or 2-methyl-1-(4-methylthiophenyl)-2-morpholinyl-1-propanone.

3. The method according to claim 2, wherein the photoinitiator is used in an amount of between 2 and 10% by weight of the polymerizable liquid crystal material of chiral structure.

4. The method according to claim 1, wherein the said base film is selected from the group consisting of a polycarbonate film, a polyester film or a polypropylene film.

5. The method according to claim 1, wherein the said base film is coated with a polyimide-type liquid crystal orientation agent or treated with polyvinyl alcohol.

6. The method according to claim 1, wherein the coating has a controlled thickness of from 2 to 15 μm.

7. The method of claim 1, wherein the drying after local exposure to an ultraviolet lamp is at a temperature in the range of 80 to 120° C.

8. The method of claim 7, wherein the drying after local exposure to an ultraviolet lamp is at a higher temperature than said heating temperature.

9. The method according to claim 7, wherein the first local exposure is for an exposure time of 5 to 30 seconds and an exposure energy of from 1.5 to 15 mw/cm$^2$, drying of the coated base film is for 0.5 to 2.5 minutes, and the second ultraviolet exposure is at an exposure time of 5 to 30 seconds and an exposure energy of 1.5 to 15 mw/cm2.

* * * * *

UNITED STATES PATENT AND TRADEMARK OFFICE
CERTIFICATE OF CORRECTION

PATENT NO. : 8,632,849 B2
APPLICATION NO. : 13/125749
DATED : January 21, 2014
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 215 days.

Signed and Sealed this
Twenty-second Day of September, 2015

Michelle K. Lee
*Director of the United States Patent and Trademark Office*